(12) United States Patent
Ishida et al.

(10) Patent No.: US 11,994,633 B2
(45) Date of Patent: May 28, 2024

(54) OBJECT DETECTION DEVICE, OBJECT DETECTION METHOD, AND CONTROL DEVICE

(71) Applicant: DENSO CORPORATION, Kariya (JP)

(72) Inventors: Syoya Ishida, Nisshin (JP); Takuya Nomura, Kariya (JP); Satoru Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 17/645,557

(22) Filed: Dec. 22, 2021

(65) Prior Publication Data
US 2022/0113391 A1 Apr. 14, 2022

Related U.S. Application Data

(63) Continuation of application No. PCT/JP2020/021775, filed on Jun. 2, 2020.

(30) Foreign Application Priority Data

Jun. 26, 2019 (JP) ................................ 2019-118736

(51) Int. Cl.
*G01S 7/524* (2006.01)
*G01S 15/87* (2006.01)
*G01S 15/93* (2020.01)

(52) U.S. Cl.
CPC .............. *G01S 7/524* (2013.01); *G01S 15/87* (2013.01); *G01S 15/93* (2013.01)

(58) Field of Classification Search
CPC .......... G01S 7/524; G01S 15/87; G01S 15/93; G01S 7/527; G01S 15/104; G01S 15/931; G01S 15/878
See application file for complete search history.

(56) References Cited

U.S. PATENT DOCUMENTS

| 2013/0342388 | A1 | 12/2013 | Maeno et al. |
| 2022/0113391 | A1* | 4/2022 | Ishida ................... G01S 15/878 |

FOREIGN PATENT DOCUMENTS

| CN | 1829395 | A | * | 9/2006 | ............. G01S 15/42 |
| CN | 114026450 | A | * | 2/2022 | ............. G01S 15/87 |
| DE | 112020003060 | T5 | * | 3/2022 | ............. G01S 15/87 |
| EP | 2808699 | A2 | * | 12/2014 | ............. G01S 15/02 |

(Continued)

*Primary Examiner* — Daniel Pihulic
(74) *Attorney, Agent, or Firm* — MASCHOFF BRENNAN (57) ABSTRACT

A plurality of ultrasonic sensors are configured such that search ultrasonic waves transmitted from the respective ultrasonic sensors have mutually different characteristics that are mutually distinguishable. A transmission timing setting unit is configured to set a transmission timing of transmitting the search ultrasonic wave for each of the ultrasonic sensors, such that the plurality of ultrasonic sensors transmit the respective search ultrasonic waves at respective transmission timings that are mutually different. The transmission timing setting unit is configured to set a delay time between a first transmission timing, which is a transmission timing of the first ultrasonic sensor, and a second transmission timing, which is a transmission timing of the second ultrasonic sensor, with the delay time being determined based on a positional relationship between the first ultrasonic sensor and the second ultrasonic sensor.

18 Claims, 4 Drawing Sheets

(56) References Cited

FOREIGN PATENT DOCUMENTS

| | | | | |
|---|---|---|---|---|
| JP | 61-271485 | A | 12/1986 | |
| JP | 2006-84428 | A | 3/2006 | |
| JP | 2006-298266 | A | 11/2006 | |
| JP | 2018105701 | A * | 7/2018 | |
| JP | 7168083 | B2 * | 11/2022 | ............. G01S 15/87 |
| WO | 2010/146619 | A1 | 12/2010 | |
| WO | WO-2020261894 | A1 * | 12/2020 | ............. G01S 15/87 |

* cited by examiner

OBJECT DETECTION DEVICE, OBJECT DETECTION METHOD, AND CONTROL DEVICE

CROSS-REFERENCE TO RELATED APPLICATION

The present application is a continuation application of International Application No. PCT/JP2020/021775, filed on Jun. 2, 2020, which claims priority to Japanese Patent Application No. 2019-118736, filed on Jun. 26, 2019. The contents of these applications are incorporated herein by reference in their entirety.

BACKGROUND

Technical Field

The present disclosure relates to an object detection device and an object detection method. Furthermore the present disclosure relates to a device which controls respective operations of a plurality of ultrasonic sensors.

Background Technology

An obstacle detection device includes a control device and a plurality of ultrasonic sensors. The control device detects the position of an obstacle by transmitting and receiving ultrasonic waves simultaneously with a plurality of ultrasonic sensors. Specifically, the control device sequentially switches between executing transmission by two or more specific ultrasonic sensors that have detected an obstacle, while also executing reception by all of the ultrasonic sensors. The control device continues to detect the obstacle until it can no longer be detected within the detection area of the specific ultrasonic sensors. This can enhance the responsiveness of the object detection device in detecting obstacles that are approaching at high speed.

SUMMARY

In the present disclosure, provided is an object detection device as the following.

The object detection device includes a plurality of ultrasonic sensors and a control unit. The plurality of ultrasonic sensors are configured such that search ultrasonic waves transmitted from the respective ultrasonic sensors have mutually different characteristics that are mutually distinguishable. The control unit includes a transmission timing setting unit configured to set a transmission timing of transmitting the search ultrasonic wave for each of the ultrasonic sensors, such that the plurality of ultrasonic sensors transmit the respective search ultrasonic waves at respective transmission timings that are mutually different. The plurality of ultrasonic sensors including at least a first ultrasonic sensor and a second ultrasonic sensor, the transmission timing setting unit is configured to set a delay time between a first transmission timing, which is a transmission timing of the first ultrasonic sensor, and a second transmission timing, which is a transmission timing of the second ultrasonic sensor, with the delay time being determined based on a positional relationship between the first ultrasonic sensor and the second ultrasonic sensor.

DETAILED DESCRIPTION OF THE PREFERRED EMBODIMENTS

Patent Document 1: International Publication No. 2010/146619

With an obstacle detection device such as that disclosed in Patent Document 1 it is possible to shorten the detection cycle of the entire device and speed up detection, by executing transmission and reception of ultrasonic waves simultaneously by a plurality of ultrasonic sensors. However with that obstacle detection device, some time is required for identifying two or more ultrasonic sensors that have detected an obstacle. Furthermore, if execution of transmission is limited to specific ones of a plurality of ultrasonic sensors, the detection region becomes limited.

The present disclosure has been prepared in view of the circumstances exemplified above. That is, the present disclosure provides an object detection device and an object detection method capable of satisfactorily realizing high-speed object detection that utilizes a plurality of ultrasonic sensors, by shortening the detection cycle.

According to one aspect of the present disclosure, an object detection device comprising:
  a plurality of ultrasonic sensors configured to each transmit a search ultrasonic wave and receive a reflected wave resulting from reflection of the search ultrasonic wave by an object in the surroundings, to thereby detect the object, and
  a control unit configured to control the operations of the respective ultrasonic sensors;
  wherein:
  the plurality of ultrasonic sensors are configured such that the search ultrasonic waves transmitted from the respective ultrasonic sensors have mutually different characteristics that are mutually distinguishable,
  the control unit includes:
  a transmission timing setting unit configured to set a transmission timing of transmitting the search ultrasonic wave for each of the ultrasonic sensors, such that the plurality of ultrasonic sensors transmit the respective search ultrasonic waves at respective transmission timings that are mutually different, and a transmission instruction unit configured to instruct each of the ultrasonic sensors to start to transmit the search ultrasonic wave, based on the transmission timing set by the transmission timing setting unit; and the plurality of ultrasonic sensors including at least a first ultrasonic sensor and a second ultrasonic sensor, the transmission timing setting unit is configured to set a delay time between a first transmission timing, which is a transmission timing of the first ultrasonic sensor, and a second transmission timing, which is a transmission timing of the second ultrasonic sensor, with the delay time being determined based on a positional relationship between the first ultrasonic sensor and the second ultrasonic sensor.

According to another aspect of the present disclosure, a control device controlling the operations of each of a plurality of ultrasonic sensors, the plurality of ultrasonic sensors being included in an object detection device, the plurality of ultrasonic sensors being configured to each transmit a search ultrasonic wave and receive a reflected wave resulting from reflection of the search ultrasonic wave by an object in the surroundings, to thereby detect the object, the search ultrasonic waves transmitted from the respective ultrasonic sensors having mutually different characteristics that are mutually distinguishable, wherein the control device comprises:
a transmission timing setting unit configured to set a transmission timing of transmitting the search ultrasonic wave for each of the ultrasonic sensors, such that the plurality of ultrasonic sensors transmit the respective search ultrasonic waves at respective transmission timings that are mutually different and a transmission instruction unit configured to instruct each of the ultrasonic sensors to start to transmit the search ultrasonic wave, based on the transmission timing set by the transmission timing setting unit; and the plurality of ultrasonic sensors including at least a first ultrasonic sensor and a second ultrasonic sensor, the transmission timing setting unit is configured to set a delay time between a first transmission timing, which is a transmission timing of the first ultrasonic sensor, and a second transmission timing, which is a transmission timing of the second ultrasonic sensor, with the delay time being determined based on a positional relationship between the first ultrasonic sensor and the second ultrasonic sensor.

According to another aspect of the present disclosure, an object detection method that is executed by an object detection device, the object detection device comprising:
a plurality of ultrasonic sensors configured to each transmit a search ultrasonic wave and receive a reflected wave resulting from reflection of the search ultrasonic wave by an object in the surroundings, to thereby detect the object, and a control unit configured to control the operations of the respective ultrasonic sensors;

wherein the object detection method comprises:
a transmitting step in which the respective ultrasonic sensors transmit the search ultrasonic waves which have mutually different characteristics that are mutually distinguishable, a transmission timing setting step in which a transmission timing of transmitting the search ultrasonic wave are set for each of the ultrasonic sensors, such that the plurality of ultrasonic sensors transmit the respective search ultrasonic waves at respective transmission timings that are mutually different, and an instructing step in which each of the ultrasonic sensors is instructed to start to transmit the search ultrasonic wave, based on the set transmission timing; and wherein the plurality of ultrasonic sensors includes at least a first ultrasonic sensor and a second ultrasonic sensor, and the transmission timing setting step comprises:
setting a delay time between a first transmission timing, which is a transmission timing of the first ultrasonic sensor, and a second transmission timing, which is a transmission timing of the second ultrasonic sensor, the delay time being determined based on a positional relationship between the first ultrasonic sensor and the second ultrasonic sensor.

In the present disclosure, elements may be indicated by reference symbols in parentheses. However, such reference symbols indicate only examples of correspondences between the elements and specific means described hereinafter in the embodiments. Hence the present disclosure is not limited in any way by the reference symbols.

EMBODIMENTS

An embodiment of the present disclosure is described in the following with reference to the drawings. It should be noted that if various modifications applicable to one embodiment were to be inserted in a series of explanations relating to the embodiment, the understanding of the embodiment might be hindered. For that reason, modification examples will be described together after the description of the embodiment.

(Overall Structure)

Figure 1:
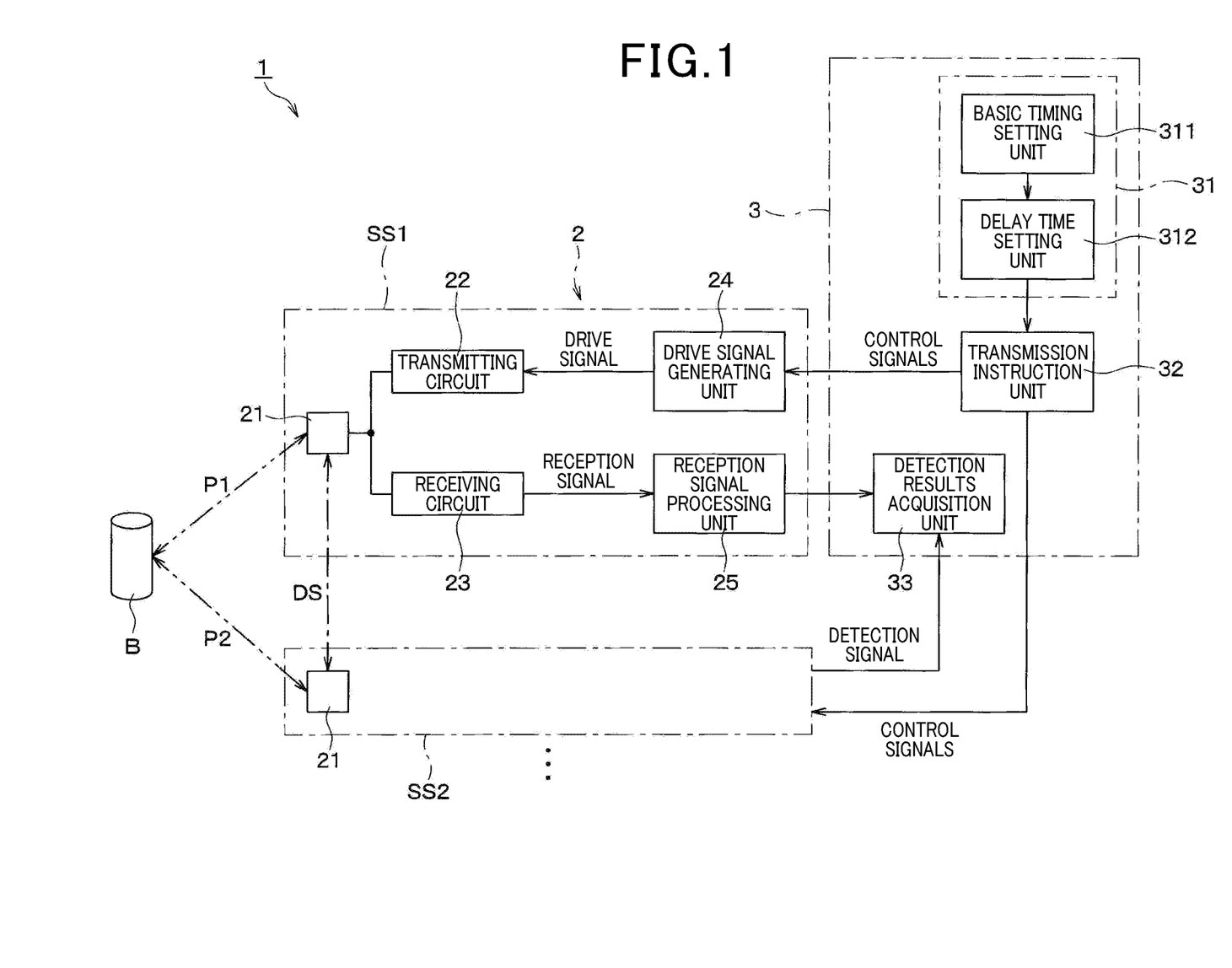
FIG. 1 is a block diagram showing the schematic configuration of an object detection device and a control unit according to an embodiment.

FIG. 1 shows an object detection device 1, which is mounted on a vehicle (not shown) and is configured to detect an object B in the surroundings of the vehicle. The vehicle equipped with the object detection device 1 is hereinafter referred to as the "own vehicle", and is, for example, an automobile.

The object detection device 1 includes a plurality of ultrasonic sensors 2 and a control unit 3 that controls the operations of each of the plurality of ultrasonic sensors 2. Each of the plurality of ultrasonic sensors 2 is configured to detect the object B by transmitting search waves consisting of ultrasonic waves and receiving reflected waves that are the search waves reflected by the object B.

Each ultrasonic sensor 2 includes a transducer 21, a transmitting circuit 22, a receiving circuit 23, a drive signal generating unit 24, and a reception signal processing unit 25. The transducer 21 functions as a transmitter for transmitting the search waves to the exterior and functions as a receiver for receiving the reflected waves, and is electrically connected to the transmitting circuit 22 and the receiving circuit 23. That is, the ultrasonic sensor 2 has what is known as a transceiver integrated configuration.

Specifically, the transducer 21 is configured as an ultrasonic microphone incorporating an electric-mechanical energy conversion element such as a piezoelectric element. The transducer 21 is arranged at a position facing the outer surface of the own vehicle so that the search waves can be transmitted to the exterior of the own vehicle and the reflected waves can be received from the exterior of the own vehicle.

The transmitting circuit 22 drives the transducer 21 based on an input drive signal, to thereby cause the transducer 21 to transmit an search wave. Specifically, the transmitting circuit 22 includes a digital/analog conversion circuit, etc. That is, the transmitting circuit 22 is configured to generate an element input signal by performing signal processing such as digital/analog conversion on a drive signal that is output from the drive signal generating unit 24. The element input signal is an AC voltage signal for driving the transducer 21. The transmitting circuit 22 is configured to generate an search wave by applying the generated element input signal to the transducer 21 and exciting the electro-mechanical energy transducer element in the transducer 21.

The receiving circuit 23 generates a reception signal corresponding to the results of receiving a reception wave resulting from the search wave transmitted by the transducer 21, and outputs the reception signal to the reception signal processing unit 25. Specifically, the receiving circuit 23 includes an amplifier circuit, an analog/digital conversion circuit, etc. The receiving circuit 23 is configured to generate the reception signal such that it conveys information on the amplitude and frequency of the reception wave, by performing signal processing such as amplification and analog/digital conversion on an element output signal output from the transducer 21. The element output signal is an AC voltage signal, generated by the electro-mechanical energy transducer element in the transducer 21 upon receiving the reception wave.

The drive signal generating unit 24 is provided for generating a drive signal that is input to the transmitting circuit 22. The drive signal serves to drive the transducer 21 to transmit an search wave.

The plurality of ultrasonic sensors 2 are provided such that their respective search waves have mutually different characteristics, that are mutually distinguishable. That is, the drive signal generating units 24 are configured to generate drive signals whereby the search waves of each of the ultrasonic sensors 2 have respective characteristics that are mutually distinguishable. Specifically, in the present embodiment, the search wave from an ultrasonic sensor 2 has an individually predetermined frequency modulation state, with the drive signal generating unit 24 of that sensor element 2 being adapted to generate a drive signal corresponding to that predetermined frequency modulation state of the search wave.

The predetermined frequency modulation states include, in this example, an up chirp and a down chirp. The up chirp is a frequency modulation state in which the frequency increases monotonically with the passage of time. A down chirp is a frequency modulation state in which the frequency decreases monotonically with the passage of time. In this specific example, the drive signal generating unit 24 is configured for assigning a multi-bit code to the search wave, by combining an up-chirp signal corresponding to the code "01", a down-chirp signal corresponding to the code "10", and a CW signal corresponding to the code "11". A CW signal has a constant frequency which does not change with the passage of time. CW is an abbreviation for continuous waveform. The "constant frequency" state corresponding to the CW signal is also included in the "frequency modulation state", and a "CW signal" is also referred to as a "CF signal", where CF is an abbreviation for continuous frequency.

Each drive signal generating unit 24 in the corresponding one of the ultrasonic sensors 2 is provided such as to generate and output respective drive signals that correspond to mutually different coding states. For example, the drive signal generating unit 24 in a certain ultrasonic sensor 2 is adapted to generate a drive signal corresponding to the 3-bit code "01, 10, 11". Similarly, the drive signal generating unit 24 in another ultrasonic sensor 2 is adapted to generate a drive signal corresponding to the 3-bit code "10, 01, 11".

The reception signal processing unit 25 is configured to generate an amplitude signal and a reception frequency signal by performing processing such as FFT processing on the reception signal. FFT is an abbreviation for Fast Fourier Transform. The amplitude signal is a signal corresponding to the amplitude of the reception wave. The reception frequency signal is a signal corresponding to the frequency of the reception wave. That is, a signal expressing the reception frequency. In other words, the reception frequency signal corresponds to the coding state of the reception signal. The reception signal processing unit 25 outputs the generated amplitude signal and reception frequency signal to the control unit 3.

(Control Device)

The control unit 3 is connected for information communication with the plurality of ultrasonic sensors 2 via in-vehicle communication lines. The control unit 3, corresponding to the control unit of the present disclosure, is configured to control the transmission/reception operations of each of the plurality of ultrasonic sensors 2.

The control unit 3 is what is known as a sonar ECU, provided with an in-vehicle microcomputer having a CPU, ROM, RAM, non-volatile rewritable memory, etc. (not shown). ECU is an abbreviation for Electronic Control Unit. The non-volatile rewritable memory is, for example, an EEPROM, a flash ROM, or the like. EEPROM is an abbreviation for Electronically Erasable and Programmable Read Only Memory. The CPU, ROM, RAM and non-volatile rewritable memory of the control unit 3 are hereinafter simply abbreviated as "CPU", "ROM", "RAM" and "non-volatile RAM". The control unit 3 has a transmission timing setting unit 31, a transmission instruction unit 32, and a detection result acquisition unit 33 as a functional configuration that is realized by the in-vehicle microcomputer.

The transmission timing setting unit 31 sets the transmission timings of the search waves in each of the plurality of ultrasonic sensors 2. In the present embodiment, the transmission timing setting unit 31 is configured to set delay times based on the mutual positional relationships between the plurality of ultrasonic sensors 2, such that the plurality of ultrasonic sensors 2 transmit respective search waves at mutually different transmission timings. Specifically, the transmission timing setting unit 31 has a basic timing setting unit 311 and a delay time setting unit 312.

The basic timing setting unit 311 is configured to set basic timings for each of the plurality of ultrasonic sensors 2. The basic timings are transmission timings that are set such that the search waves of each of the plurality of ultrasonic sensors 2 will arrive in the same cycle. That is, the basic timings are the transmission timings that are set before being corrected by the delay time setting unit 312.

The delay time setting unit 312 is provided such as to set respective delay times for each of the plurality of ultrasonic sensors 2, for time-shifting, from the basic timings, the transmission timings of the ultrasonic sensor 2, which arrive in a predetermined cycle. The delay time setting unit 312 is configured to set the delay times with respect to the basic timings based on the mutual positional relationships of the plurality of ultrasonic sensors 2. Specifically, the delay time setting unit 312 is configured such that, considering an ultrasonic sensor 2 that transmits search waves in a fixed cycle at the basic timing and another, different ultrasonic sensor 2, the transmission timings of the search waves of that other ultrasonic sensor 2 would be delayed from the basic timings by the delay time that is set by the delay time setting unit 312. A specific example of setting the delay times is described hereinafter.

The transmission instruction unit 32 is configured such as to instruct each of the plurality of ultrasonic sensors 2 to start the operation of transmitting an search wave based on the transmission timing set by the transmission timing setting unit 31. Specifically, when a transmission timing that has been set for an ultrasonic sensor 2 is reached, the transmission instruction unit 32 transmits a control signal to that ultrasonic sensor 2, causing the sensor it to start the operation of transmitting an search wave.

The detection result acquisition unit 33 is configured to acquire the amplitude signals and the reception frequency signals from the reception signal processing unit 25 and to detect the object B based on the acquired amplitude signals and reception frequency signals. Specifically, the detection result acquisition unit 33 collates an acquired reception frequency signal with a predetermined reference signal that has been stored beforehand in the ROM or the non-volatile RAM, to decode the reception frequency signal, and thereby determines the code contained in the corresponding reception wave. If the code judgement is successful, the detection result acquisition unit 33 identifies the corresponding transducer 21, and specifies the distance from that transducer 21 to the object B based on the acquired amplitude signal.

(Overview of Operation)

An outline of the operation of the present embodiment is described in the following with reference to the drawings, together with a description of the effects produced by the embodiment configuration.

In an object detection device 1 provided with a plurality of ultrasonic sensors 2 and in an object detection method executed by the object detection device 1, there is a requirement to shorten the detection cycle as far as possible, to speed up detection. In that regard, if the search waves of the plurality of ultrasonic sensors 2 could be transmitted simultaneously, without providing time differences between the transmission timings, the detection cycle of the object detection device 1 as a whole could be minimized.

However, when ultrasonic waves are transmitted and received simultaneously by a plurality of ultrasonic sensors, undetectable dead zones are produced due to overlap between reflected waves from an object B, when the reflected waves result from a plurality of search waves transmitted from different transmission sources respectively. Thus, for example, code judgement for identifying the transmission sources may fail due to overlap between the received reflected waves.

On the other hand, a configuration and method such as the device and method disclosed in Patent Document 1 might be considered for adoption, in which a plurality of ultrasonic sensors 2 simultaneously transmit and receive, and two or more specific ultrasonic sensors that have detected an obstacle, that is, an object B, are sequentially switched to perform transmission operations. However, with such a configuration and method, some time is required for identifying the specific ultrasonic sensors 2 that have detected the object B. Furthermore, if the ultrasonic sensors 2 which perform transmission operations are limited to specific ones of the plurality of ultrasonic sensors 2, the detection region becomes limited.

Therefore, with the present embodiment, the control unit 3 controls the respective transmission timings of the plurality of ultrasonic sensors 2 such that the plurality of ultrasonic sensors 2 transmit the search waves at mutually different timings. Specifically, the transmission timing setting unit 31 sets respective delay times for the plurality of ultrasonic sensors 2 based on the mutual positional relationships between the ultrasonic sensors 2.

An outline of the delay time setting will be described with reference to FIGS. 1 to 4. In FIG. 1, one of a plurality of ultrasonic sensors 2 is designated as a first ultrasonic sensor SS1, and another one is designated as a second ultrasonic sensor SS2. The transmission path between an object B and the transducer 21 in the first ultrasonic sensor SS1 is designated as a first transmission path P1, and the transmission path between the object B and the transducer 21 in the second ultrasonic sensor SS2 is designated as a second transmission path P2.

Figure 2:
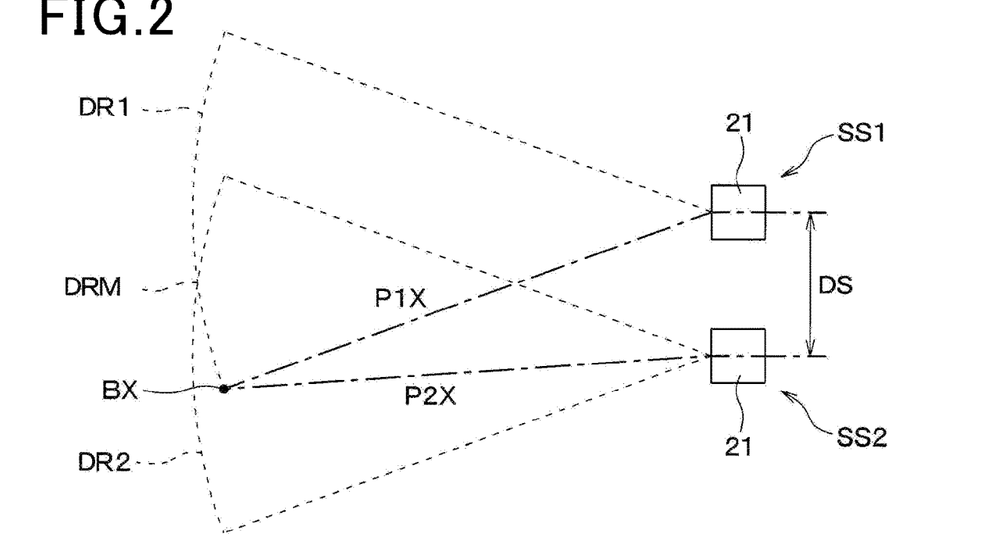
FIG. 2 is an outline conceptual diagram for illustrating a transmission timing setting method applied by the object detection device and the control unit shown in FIG. 1.

FIG. 2 shows an outline of the positional relationship between the first ultrasonic sensor SS1, the second ultrasonic sensor SS2, a first detection region DR1, and a second detection region DR2 in a plan view of the own vehicle as viewed from directly above. The first detection region DR1 is the detection region of the first ultrasonic sensor SS1 and the second detection region DR2 is the detection region of the second ultrasonic sensor SS2. The sensor distance DS is the distance between the first ultrasonic sensor SS1 and the second ultrasonic sensor SS2. To be precise, the sensor distance DS is the distance between the transducer 21 provided on the first ultrasonic sensor SS1 and the transducer 21 provided on the second ultrasonic sensor SS2.

Figure 3:
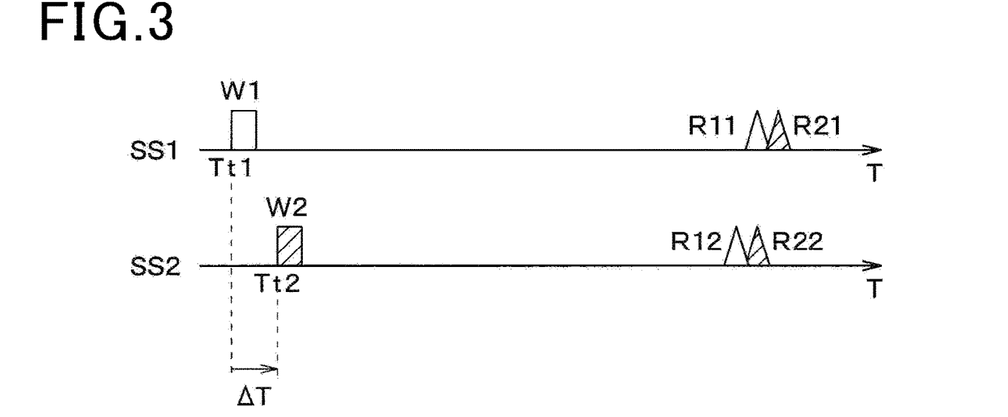
FIG. 3 is a time chart illustrating an example of transmission/reception operation by the object detection device shown in FIG. 1.
Figure 4:
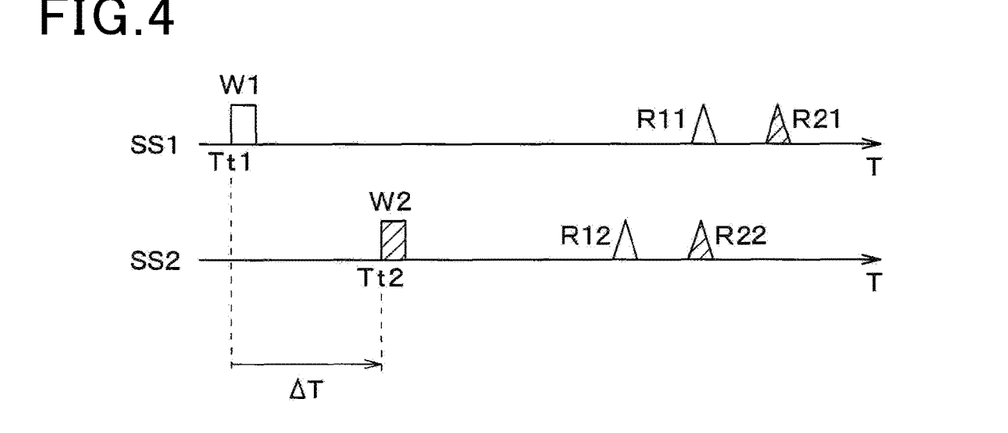
FIG. 4 is a time chart illustrating another example of transmission/reception operation by the object detection device shown in FIG. 1.

FIGS. 3 and 4 show an outline of transmission/reception operations of the first ultrasonic sensor SS1 and the second ultrasonic sensor SS2. In FIG. 3 and the like, time T is represented along the horizontal axis, the transmission waveform of an search wave is indicated by a rectangle, and the reception waveform of a reception wave is indicated by a triangle. The first search wave W1 is an search wave transmitted by the first ultrasonic sensor SS1, and the second search wave W2 is an search wave transmitted by the second ultrasonic sensor SS2. The first transmission timing Tt1 is a transmission timing of the first search wave W1 from the first ultrasonic sensor SS1, that is, a transmission start timing. The second transmission timing Tt2 is a transmission timing of the second search wave W2 from the second ultrasonic sensor SS2, that is, a transmission start timing.

Furthermore, in FIG. 3 and the like, a first direct wave R11 is a reception wave received by the first ultrasonic sensor SS1, the reception wave being a reflected wave resulting from the first search wave W1, when the first search wave W1 is reflected by the object B. A first indirect wave R12 is a reception wave received by the second ultrasonic sensor SS2, the reception wave being a reflected wave resulting from the first search wave W1, when the first search wave W1 is reflected by the object B. A second indirect wave R21 is a reception wave received by the first ultrasonic sensor SS1, the reception wave being a reflected wave resulting from the second search wave W2, when the second search wave W2 is reflected by the object B. A second direct wave R22 is a reception wave received by the second ultrasonic sensor SS2, the reception wave being a reflected wave resulting from the second search wave W2, when the second search wave W2 is reflected by the object B.

The transmission timing setting unit 31, that is, the delay time setting unit 312, sets the delay time $\Delta T$ between the first transmission timing Tt1 and the second transmission timing Tt2 which is determined based on the positional relationship between the first ultrasonic sensor SS1 and the second ultrasonic sensor SS2. When the value of the delay time $\Delta T$ is positive, $\Delta T$ is the time interval between a transmission timing of the first search wave W1 and a transmission timing of the second search wave W2, with the second search wave W2 being transmitted following the transmission of the first search wave W1. On the other hand, when the value of the delay time $\Delta T$ is negative, $\Delta T$ is the time interval between a transmission timing of the first search wave W1 and a transmission timing of the second search wave W2, with the first search wave W1 being transmitted following the transmission of the second search wave W2.

The delay time setting unit 312 sets the delay time $\Delta T$ to be equal to or greater than the value obtained by dividing the maximum value of the transmission path length difference in an overlap region DRM by the speed of sound. The overlap region DRM is the range in which a first detection region DR1 and a second detection region DR2 overlap. The first detection region DR1 can be approximately represented as having a substantially teardrop shape, formed of an ellipsoidal cone whose apex is at the position of the transducer 21 in the first ultrasonic sensor SS1 and a semi-spheroid whose bottom surface has the same shape as that of the ellipsoidal cone, with the ellipsoidal cone and the semi-spheroid joined to one another at their respective bottom surfaces. Each of these bottom surfaces is an ellipsoid, having the major axis parallel to the horizontal direction and the minor axis parallel to the height direction. The second detection region DR2 can similarly be approximately represented as having a substantially teardrop shape, formed of an ellipsoidal cone whose apex is at the position of the transducer 21 in the second ultrasonic sensor SS2 and a semi-spheroid whose bottom surface has the same shape as that of the ellipsoidal cone, with the ellipsoidal cone and the semi-spheroid joined to one another at their respective bottom surfaces. The overlap region DRM can be expressed as the three-dimensional range in which these two approximately teardrop shapes overlap one another.

The maximum value of the transmission path length difference is the difference between the length of the first reference transmission path P1X and the length of the second reference transmission path P2X shown in FIG. 2, that is, |P1X−P2X|. The first reference transmission path P1X is the transmission path between the transducer 21 in the first ultrasonic sensor SS1 and a reference point BX. The second reference transmission path P2X is the transmission path between the transducer 21 in the second ultrasonic sensor SS2 and the reference point BX. The reference point BX is a coordinate point that is within the overlap region DRM, and at which the transmission path length difference between the length of the first transmission path P1 and the length of the second transmission path P2 is a maximum. FIG. 3 shows the case where the delay time setting unit 312 sets the delay time $\Delta T$ to the value obtained by dividing the maximum value of the transmission path length difference by the speed of sound. That is, FIG. 3 shows the lower limit value set for the delay time $\Delta T$, when $\Delta T$ is determined based on the positional relationship between the first ultrasonic sensor SS1 and the second ultrasonic sensor SS2.

The delay time setting unit 312 sets the delay time $\Delta T$ to be less than the value obtained by dividing the sensor spacing DS by the speed of sound. FIG. 4, shows the case where the delay time $\Delta T$ is set to be less than the value obtained by dividing the sensor spacing DS by the speed of sound. That is, FIG. 4 shows the upper limit value set for the delay time $\Delta T$, when $\Delta T$ is determined based on the positional relationship between the first ultrasonic sensor SS1 and the second ultrasonic sensor SS2.

By setting the delay time $\Delta T$ as described above, it is possible to avoid the occurrence of overlap between the first direct wave R11 and the second indirect wave R21 at the first ultrasonic sensor SS1 as much as possible. Similarly, the occurrence of overlap between the second direct wave R22 and the first indirect wave R12 at the second ultrasonic sensor SS2 can be avoided as much as possible. The present embodiment thereby provides an device configuration and an object detection method that can satisfactorily realize high-speed detection by shortening the object detection cycle.

However if the delay time $\Delta T$ is simply set as described above, interference due to overlap between received reception waves, or overlap between reception waves and reverberation, may occur. Therefore in the configuration and method according to the present embodiment, the delay time setting unit 312 changes the delay time $\Delta T$ during execution of the transmission process by the plurality of ultrasonic sensors 2.

Specifically, for example, the delay time setting unit 312 may change the delay time $\Delta T$ each time the first transmission timing Tt1 arrives. As a result, a difference can be established between the delay time $\Delta T$ from the previous first transmission timing Tt1 to the second transmission timing Tt2 which immediately succeeded that previous first transmission timing Tt1, and the delay time $\Delta T$ from the current first transmission timing Tt1 to the second transmission timing Tt2 which immediately follows that current first transmission timing Tt1.

Figure 5:
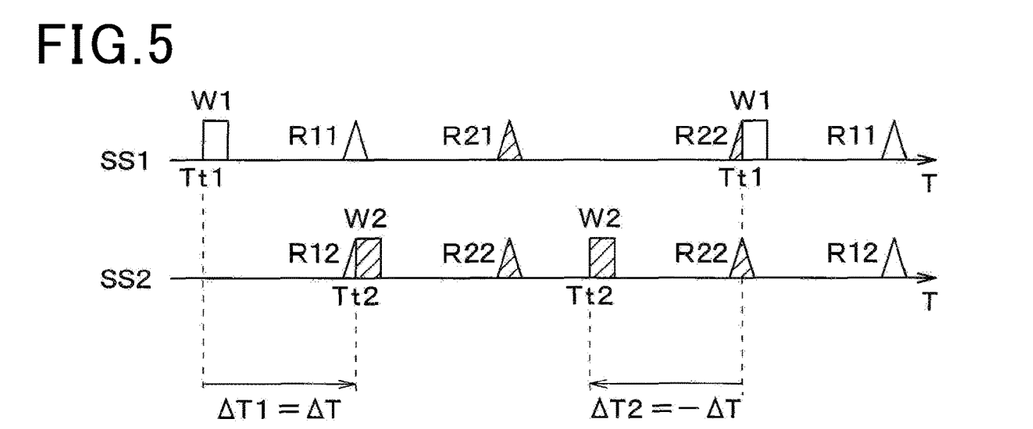
FIG. 5 is a time chart illustrating a further example of transmission/reception operation by the object detection device shown in FIG. 1.
Figure 6:
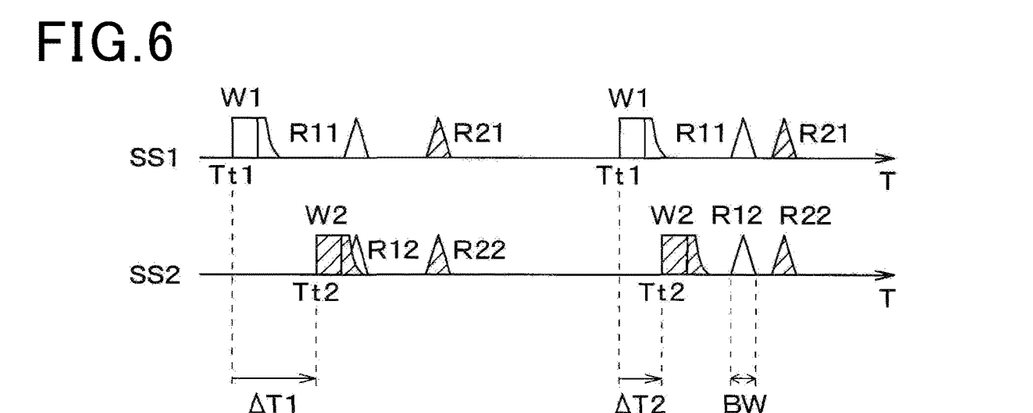
FIG. 6 is a time chart illustrating a further example of transmission/reception operation by the object detection device shown in FIG.

FIGS. 5 and 6 show examples in which the value of the delay time $\Delta T$ is switched between a first delay time $\Delta T1$ and a second delay time $\Delta T2$ each time a first transmission timing Tt1 is reached. In the example shown in FIG. 5, the first delay time $\Delta T1 = \Delta T$ and the second delay time $\Delta T2 = -\Delta T$. That is, in the example shown in FIG. 5, the absolute value of the delay time is held constant at $\Delta T$, but the delay time is alternately switched between positive and negative values.

On the other hand, in the example shown in FIG. 6, the first delay time $\Delta T1$ and the second delay time $\Delta T2$ are both positive values, and their absolute values are different from one another. The amount of change $\Delta T1 - \Delta T2$ of the delay time $\Delta T$ may be set, for example, to be equal to or greater than the reception wave time width BW, which is the time width of the reception signal of the reflected wave. For example, when the reception wave is of approximately triangular form, the reception wave time width BW corresponds to the length of the base of the triangle.

Alternatively, the amount of change $\Delta T1 - \Delta T2$ of the delay time $\Delta T$ may be set equal to or greater than the reverberation time, for example. As is well known, the "reverberation time" is the time that elapses from the end of the drive time until the reverberation converges (that is, until the amplitude waveform corresponding to the reverberation, as it decreases, reaches a predetermined threshold value). In the present embodiment, the predetermined threshold value that defines the reverberation time is made the same as the threshold value used for determining whether a reception wave is being received, that is, the threshold value used for distinguishing between received waves from road surface reflected waves and noise. In FIG. 6, the rectangles showing the transmission waveforms of the search waves in the first search wave W1 and the second search wave W2 indicate the drive times of the ultrasonic sensor 2, that is, the drive times of the transducer 21. The drive time corresponds to the output period of the drive signal. In addition, a waveform indicating reverberation is shown in simplified form immediately after a rectangle showing a drive time. More preferably, the amount of change $\Delta T1 - \Delta T2$ in the delay time $\Delta T$ can for example be set equal to or greater than a dead zone time, which includes the reverberation time and the drive time required for the ultrasonic sensor 2 to transmit an search wave.

An example of switching the delay time ΔT between the first delay time ΔT1 and the second delay time ΔT2 each time a transmission timing arrives will be described with reference to FIGS. 7 and 8. In these figures, "S" is an abbreviation for "step". When the object detection conditions are satisfied, the CPU in the control unit 3 reads out the object detection routine shown in FIG. 7 from the ROM or the non-volatile RAM and executes the routine.

Figure 7:
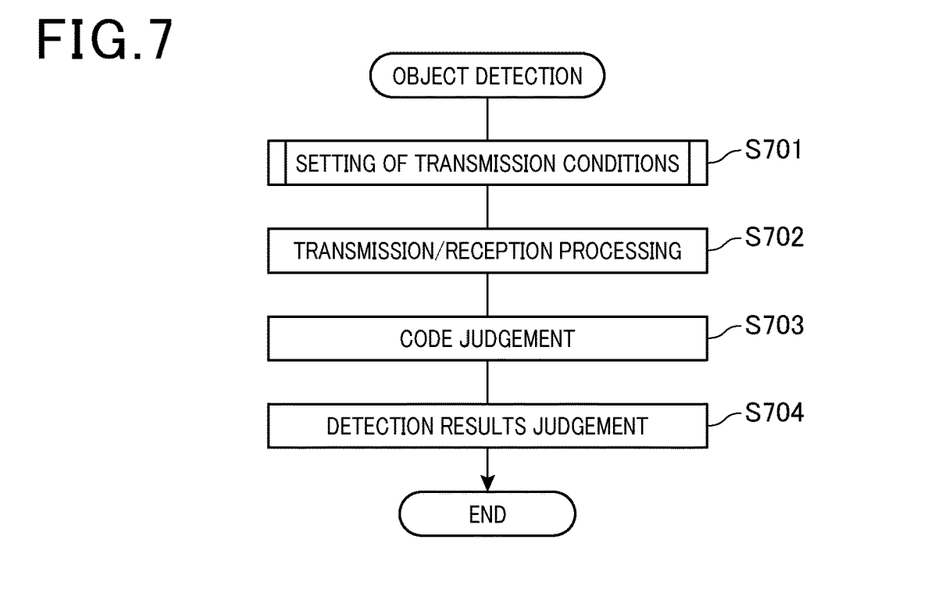
FIG. 7 is a flowchart showing an example of operation by the object detection device shown in FIG. 1.

When the routine shown in FIG. 7 is activated, the CPU first, in step S701, sets the transmission conditions, including the delay time ΔT. Details of the transmission condition setting are described hereinafter. Next, in step S702, the CPU executes transmission/reception processing based on the transmission conditions set in step S701.

Subsequently, in step S703, the CPU executes code judgement by decoding the reception signal. Finally, in step S704, the CPU determines the object detection result based on the code judgement result. Specifically, if the code judgement is successful the CPU calculates the distance from the transducer 21 to the object B based on the corresponding amplitude signal. The CPU also calculates the relative position of the object B with respect to the own vehicle, based on the distance calculation result. Needless to say, the setting of the delay time ΔT is taken into consideration with respect to the threshold value, the STC, and the TOF in the detection result output, when judging the object detection result. STC is an abbreviation for Sensitivity Time Control, and TOF is an abbreviation for Time of Flight.

Figure 8:
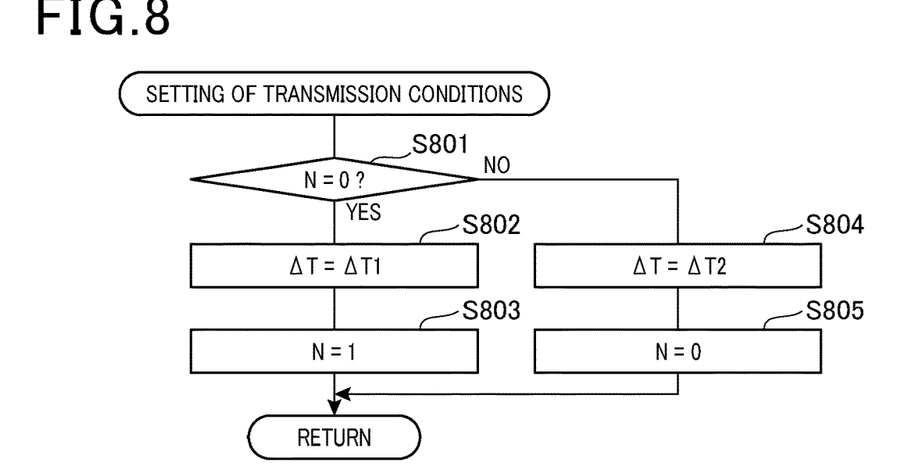
FIG. 8 is a flowchart showing an example of a transmission condition setting operation shown in FIG. 7.

FIG. 8 shows the contents of the transmission condition setting process of step S701. In step S801 of FIG. 8, the CPU determines whether the value of the counter N is 0.

If the value of the counter N is 0 (that is, step S801=YES), the CPU successively executes the processes of step 802 and step 803, then advances to the process of step 702. When step S801 is executed for the first time immediately after the object detection condition is satisfied, it is assumed that the counter N has been initialized to 0.

In step S802, the CPU sets the delay time ΔT to the first delay time ΔT1. In step S803, the CPU sets the value of the counter N to 1. As a result, when step S701 is next executed, the value of the counter N is 1, so that the judgement decision in step S801 becomes NO, and the processing proceeds to step 804.

On the other hand, if the value of the counter N is not 0 (that is, if there is a NO decision in step S801), the CPU successively executes the processes of steps S804 and S805, then advances to step S702. In step S804, the CPU sets the delay time ΔT to the second delay time ΔT2. In step S805, the CPU sets the value of the counter N to 0. As a result, when step S701 is next executed, the value of the counter N is 0, so that the judgement decision in step S801 becomes YES, and the processing proceeds to step S802.

MODIFICATION EXAMPLES

The present disclosure is not limited to the above embodiment, which may be modified as appropriate. Typical modifications are described in the following. The descriptions of the modification examples focus mainly on differences from the above-described embodiment. Components that are identical or equivalent in the above-described embodiment and the modification example are designated by the same reference numerals as for the above-described embodiment. Therefore, in the following description of the modification example, the descriptions of components in the above-described embodiment may be appropriately applied to components having the same reference numerals in the modification examples, unless there is a technical contradiction or a special additional explanation is provided.

The object detection device 1 is not limited to a vehicle-mounted obstacle detection device, that is, an object detection device 1 which is installed in a vehicle, and could for example be mounted on a ship or an aircraft.

The object detection device 1 is not limited to a configuration in which ultrasonic waves can be transmitted and received by a single transducer 21. That is, a transmitting transducer 21 which is electrically connected to the transmitting circuit 22 and a receiving transducer 21 which is electrically connected to the receiving circuit 23 may be provided in parallel, for example.

The ultrasonic sensor 2 and the control unit 3 are not limited to the specific configurations shown for the above embodiment. For example, the digital/analog conversion circuit may be provided in the drive signal generating unit 24 instead of in the transmitting circuit 22.

The drive signal generating unit 24 may be provided in the control unit 3. Similarly, the reception signal processing unit 25 may be provided in the control unit 3.

The coding method is not limited to chirp coding. For example, the coding may use phase modulation or on-off modulation.

The mode of changing the delay time ΔT is not limited to that of the above specific example. That is, three or more types of fixed delay times ΔT could be applied sequentially or randomly, for example. Furthermore, the predetermined threshold value that defines "reverberation time," when the amount of change ΔT1–ΔT2 of the delay time ΔT is made equal to or longer than the reverberation time, does not have to be the same as the threshold value for distinguishing between received waves from road surface reflected waves and noise. For example, the predetermined threshold value that defines "reverberation time" may be such that the residual reverberation that can be distinguished from the reception waves remains.

The amount of change ΔT1–ΔT2 of the delay time ΔT may be constant, cyclically changed, or randomly changed.

The delay time ΔT does not have to be changed if the received reflected wave and the reverberation do not overlap, and received reflected waves do not overlap one another. In other words, the transmission timing setting unit 31, that is, the delay time setting unit 312, can be configured such as to change the delay time ΔT only if the received reflected wave and a reverberation overlap one another, or if received reflected waves overlap one another, in the second ultrasonic sensor SS2.

Figure 9:
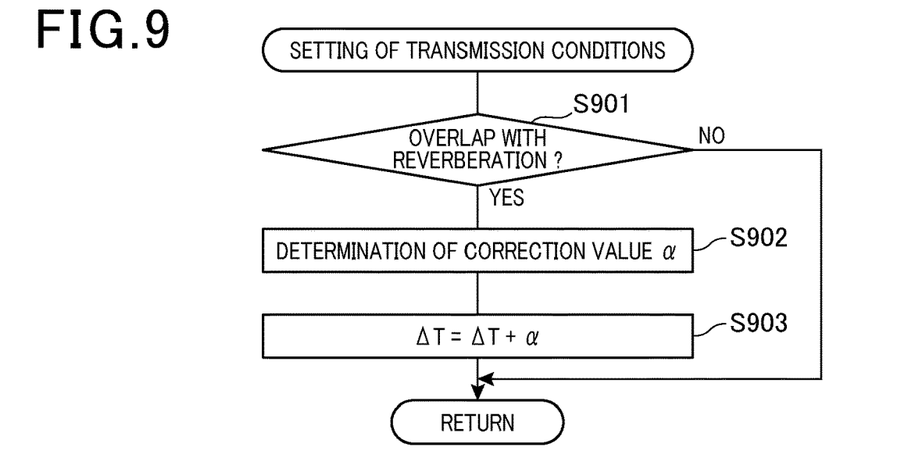
FIG. 9 is a flowchart showing another example of the transmission condition setting operation shown in FIG. 7.

FIG. 9 shows an example in which the delay time ΔT is changed when the received reflected wave and the reverberation overlap. The subroutine shown in FIG. 9 replaces the subroutine shown in FIG. 8.

In step S901 of FIG. 9, the CPU judges whether the received reflected wave and reverberation overlap one another. FIG. 6 shows an example in which a first indirect wave R12 and the reverberation of a second search wave W2 overlap one another.

If there is overlap between the reception wave and a reverberation (that is, step S901=YES), the CPU sequentially executes the processes of step S902 and step S903, then advances to step S702. On the other hand, if there is no overlap between the reception wave and a reverberation (that is, step S901=NO), the CPU skips the processes of steps S902 and S903 and advances to step S702.

In step S902, the CPU determines a correction value a, based on the state of overlapping between the reception wave and the reverberation. Specifically, for example, the CPU determines the correction value a based on the reverberation time. In step S903, the CPU changes the delay time ΔT by correcting the delay time ΔT with the correction value α.

Figure 10:
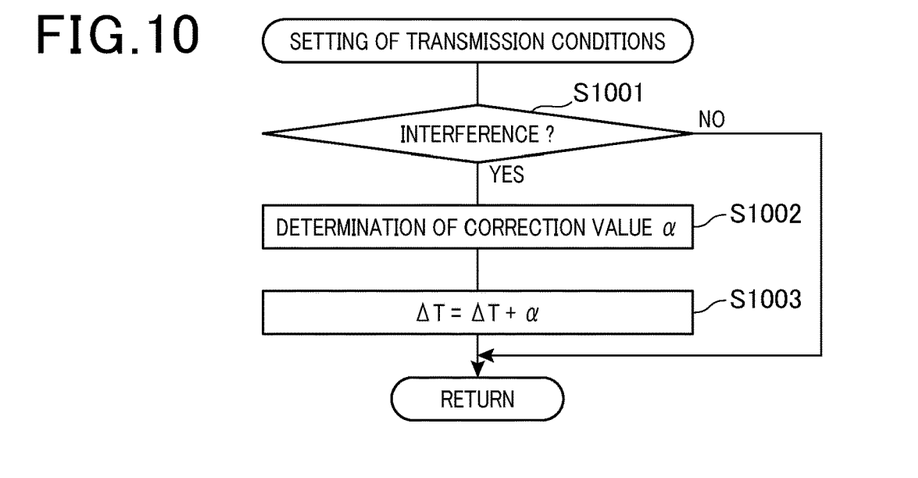
FIG. 10 is a flowchart showing a further example of the transmission condition setting operation shown in FIG. 7.

FIG. 10 shows an example in which the delay time ΔT is changed when received reflected waves overlap one another and the code judgement fails. In step S1001 of FIG. 10, the CPU judges whether received reflected waves overlap with one another.

If it is judged that there are received reflected waves which overlap one another (that is, step S1001=YES), the CPU sequentially executes the processes of steps S1002 and S1003, then advances the processing to step S702. On the other hand, if it is judged that the received reflected waves do not overlap with one another (that is, step S1001=NO), the CPU skips the processes of steps S1002 and S1003 and advances the processing to step S702.

In step S1002, the CPU determines the correction value a based on the state of overlapping between the reception waves. In step S1003, the CPU changes the delay time ΔT, by correcting ΔT with the correction value α.

The example of FIG. 9 and the example of FIG. 10 can be combined. That is, for example, the processes of steps S1001 to S1003 can be executed if the judgement decision in step S901 is "NO".

The above functional configuration and method may be realized by a dedicated computer having a processor and memory, programmed to perform one or more functions embodied by a computer program. Alternatively, the above functional configuration and method may be implemented by a dedicated computer having a processor configured with one or more dedicated hardware logic circuits. Alternatively, the above functional configuration and method may be realized by one or more dedicated computers each having a combination of a processor and memory programmed to perform one or more functions and a processor configured with one or more hardware logic circuits. Specifically, the control unit 3 is not limited to well-known types of microcomputer provided with a CPU, etc. That is, all or part of the control unit 3 may consist of digital circuitry configured to realize the above-mentioned functions, for example, an ASIC or an FPGA. ASIC is an abbreviation for Application Specific Integrated Circuit. FPGA is an abbreviation for Field Programmable Gate Array. The computer program may be stored in a computer-readable non-volatile substantive storage medium, as instructions to be executed by the computer. That is, the object detection device or method according to the present disclosure can be expressed as a computer program that incorporates procedures for realizing each of the above functions or methods, or as a non-volatile substantive storage medium that stores the program.

It will be understood that the elements constituting the above embodiment are not necessarily essential, other than when it is clearly stated that they are essential, or when they are clearly considered to be essential in principle. In addition, when numeric values such as numbers, numeric values, quantities, and ranges of components are mentioned, the disclosure is not limited to these specific numeric values unless it is clearly stated in the specification that they are particularly essential, or it is logically apparent that the disclosure is limited to these specific numeric values. Similarly, when shapes, directions, positional relationships, etc., of constituent elements are mentioned, the disclosure is not limited to these shapes, directions, positional relationships, etc., unless they are clearly stated to be particularly essential and the disclosure is limited to them in principle.

The possible modifications are not limited to the above examples. Furthermore, a plurality of the modification examples can be combined with one another. Furthermore, all or part of the above embodiment can be combined with all or part of the modification examples.

In the broadest sense, the following device is disclosed in this specification.

An object detection device (1) comprising:
  a plurality of ultrasonic sensors (2) configured to each transmit a search ultrasonic wave and receive a reflected wave resulting from reflection of the search ultrasonic wave by an object (B) in the surroundings, to thereby detect the object, and
  a control unit (3) configured to control the operations of the respective ultrasonic sensors;
wherein:
  the plurality of ultrasonic sensors are configured such that the search ultrasonic waves transmitted from the respective ultrasonic sensors have mutually different characteristics that are mutually distinguishable,
  the control unit includes a transmission timing setting unit (31) configured to set a transmission timing of transmitting the search ultrasonic wave for each of the ultrasonic sensors, such that the plurality of ultrasonic sensors transmit the respective search ultrasonic waves at respective transmission timings that are mutually different,
  the plurality of ultrasonic sensors including at least a first ultrasonic sensor and a second ultrasonic sensor,
  the transmission timing setting unit is configured to set a delay time between a first transmission timing (Tt1), which is a transmission timing of the first ultrasonic sensor, and a second transmission timing (Tt2), which is a transmission timing of the second ultrasonic sensor, with the delay time being determined based on a positional relationship between the first ultrasonic sensor and the second ultrasonic sensor.

A control device (3) controlling the operations of each of a plurality of ultrasonic sensors (2), the plurality of ultrasonic sensors (2) being included in an object detection device. The plurality of ultrasonic sensors are configured to each transmit a search ultrasonic wave and receive a reflected wave resulting from reflection of the search ultrasonic wave by an object (B) in the surroundings, to thereby detect the object, the search ultrasonic waves transmitted from the respective ultrasonic sensors having mutually different characteristics that are mutually distinguishable.

The control device (3) comprises a transmission timing setting unit (31) configured to set a transmission timing of transmitting the search ultrasonic wave for each of the ultrasonic sensors, such that the plurality of ultrasonic sensors transmit the respective search ultrasonic waves at respective transmission timings that are mutually different,
  the plurality of ultrasonic sensors including at least a first ultrasonic sensor and a second ultrasonic sensor,
  the transmission timing setting unit is configured to set a delay time between a first transmission timing (Tt1), which is a transmission timing of the first ultrasonic sensor, and a second transmission timing (Tt2), which is a transmission timing of the second ultrasonic sensor, the delay time being determined based on a positional relationship between the first ultrasonic sensor and the second ultrasonic sensor.

What is claimed is:

1. An object detection device comprising:
a plurality of ultrasonic sensors configured to each transmit a search ultrasonic wave and receive a reflected wave resulting from reflection of the search ultrasonic wave by an object, to thereby detect the object, and
a control unit configured to control operations of the respective ultrasonic sensors;
wherein:
the plurality of ultrasonic sensors are configured such that the search ultrasonic waves transmitted from the respective ultrasonic sensors have mutually different characteristics that are mutually distinguishable,
the control unit includes:
a transmission timing setting unit configured to set a transmission timing of transmitting the search ultrasonic wave for each of the ultrasonic sensors, and
a transmission instruction unit configured to instruct each of the ultrasonic sensors to start to transmit the search ultrasonic wave, based on the transmission timing set by the transmission timing setting unit; and
the transmission timing setting unit is configured to:
defining one of the plurality of ultrasonic sensors as a first ultrasonic sensor and another one of the plurality of ultrasonic sensors as a second ultrasonic sensor, set a delay time between a first transmission timing which is the transmission timing of the first ultrasonic sensor and a second transmission timing which is the transmission timing of the second ultrasonic sensor; and
set the delay time to be equal to or greater than a value obtained by dividing a maximum value of a transmission path length difference within an overlap region by the speed of sound, the transmission path length difference being a difference between a length of a transmission path of the search ultrasonic wave from the first ultrasonic sensor and a length of a transmission path of the search ultrasonic wave from the second ultrasonic sensor, the overlap region being a range in which a first detection region and a second detection region overlap one another, the first detection region being a detection region of the first ultrasonic sensor, the second detection region being a detection region of the second ultrasonic sensor.

2. The object detection device according to claim 1, wherein
the transmission timing setting unit is configured to set the delay time to be less than a value obtained by dividing a sensor distance between the first ultrasonic sensor and the second ultrasonic sensor by the speed of sound.

3. The object detection device according to claim 1, wherein
the transmission timing setting unit is configured to change the delay time at each arrival of the first transmission timing, such that the delay time between the preceding first transmission timing and the immediately succeeding second transmission timing and the delay time between the current first transmission timing and the immediately succeeding second transmission timing are different from one another.

4. The object detection device according to claim 1, wherein
the transmission timing setting unit is configured to change the delay time for the second ultrasonic sensor in response to overlap occurring between a received reflected wave and reverberation, or in response to received reflected waves overlapping one another.

5. The object detection device according to claim 3, wherein
the transmission timing setting unit is configured to set an amount of change in the delay time to be equal to or greater than a time width of a reception signal of the reflected wave.

6. The object detection device according to claim 3, wherein
the transmission timing setting unit is configured to set an amount of change in the delay time to be equal to or greater than a reverberation time.

7. A control device controlling operations of each of a plurality of ultrasonic sensors, the plurality of ultrasonic sensors being included in an object detection device, the plurality of ultrasonic sensors being configured to each transmit a search ultrasonic wave and receive a reflected wave resulting from reflection of the search ultrasonic wave by an object, to thereby detect the object, the search ultrasonic waves transmitted from the respective ultrasonic sensors having mutually different characteristics that are mutually distinguishable,
wherein the control device comprises:
a transmission timing setting unit configured to set a transmission timing of transmitting the search ultrasonic wave for each of the ultrasonic sensors, and
a transmission instruction unit configured to instruct each of the ultrasonic sensors to start to transmit the search ultrasonic wave, based on the transmission timing set by the transmission timing setting unit; and
the transmission timing setting unit is configured to:
defining one of the plurality of ultrasonic sensors as a first ultrasonic sensor and another one of the plurality of ultrasonic sensors as a second ultrasonic sensor, set a delay time between a first transmission timing which is the transmission timing of the first ultrasonic sensor and a second transmission timing which is the transmission timing of the second ultrasonic sensor; and
set the delay time to be equal to or greater than a value obtained by dividing a maximum value of a transmission path length difference within an overlap region by the speed of sound, the transmission path length difference being a difference between a length of a transmission path of the search ultrasonic wave from the first ultrasonic sensor and a length of a transmission path of the search ultrasonic wave from the second ultrasonic sensor, the overlap region being a range in which a first detection region and a second detection region overlap one another, the first detection region being a detection region of the first ultrasonic sensor, the second detection region being a detection region of the second ultrasonic sensor.

8. The control device according to claim 7, wherein
the transmission timing setting unit is configured to set the delay time to be less than a value obtained by dividing a sensor distance between the first ultrasonic sensor and the second ultrasonic sensor by the speed of sound.

9. The control device according to claim 7, wherein
the transmission timing setting unit is configured to change the delay time at each arrival of the first transmission timing, such that the delay time between the preceding first transmission timing and the immediately succeeding second transmission timing and the delay time between the current first transmission timing and the immediately succeeding second transmission timing are different from one another.

10. The control device according to claim 7, wherein
the transmission timing setting unit is configured to change the delay time for the second ultrasonic sensor in response to overlap occurring between a received reflected wave and reverberation, or in response to received reflected waves overlapping one another.

11. The control device according to claim 9, wherein
the transmission timing setting unit is configured to set an amount of change in the delay time to be equal to or greater than a time width of a reception signal of the reflected wave.

12. The control device according to claim 9, wherein
the transmission timing setting unit is configured to set an amount of change in the delay time to be equal to or greater than a reverberation time.

13. An object detection method that is executed by an object detection device,
the object detection device comprising:
a plurality of ultrasonic sensors configured to each transmit a search ultrasonic wave and receive a reflected wave resulting from reflection of the search ultrasonic wave by an object, to thereby detect the object, and
a control unit configured to control operations of the respective ultrasonic sensors;
wherein the object detection method comprises:
a transmitting step in which the respective ultrasonic sensors transmit the search ultrasonic waves which have mutually different characteristics that are mutually distinguishable,
a transmission timing setting step in which a transmission timing of transmitting the search ultrasonic wave are set for each of the ultrasonic sensors, and
an instructing step in which each of the ultrasonic sensors is instructed to start to transmit the search ultrasonic wave, based on the set transmission timing; and
wherein the transmission timing setting step comprises:
defining one of the plurality of ultrasonic sensors as a first ultrasonic sensor and another one of the plurality of ultrasonic sensors as a second ultrasonic sensor, setting a delay time between a first transmission timing which is the transmission timing of the first ultrasonic sensor and a second transmission timing which is the transmission timing of the second ultrasonic sensor; and
setting the delay time to be equal to or greater than a value obtained by dividing a maximum value of a transmission path length difference within an overlap region by the speed of sound, the transmission path length difference being a difference between a length of a transmission path of the search ultrasonic wave from the first ultrasonic sensor and a length of a transmission path of the search ultrasonic wave from the second ultrasonic sensor, the overlap region being a range in which a first detection region and a second detection region overlap one another, the first detection region being a detection region of the first ultrasonic sensor, the second detection region being a detection region of the second ultrasonic sensor.

14. The object detection method according to claim 13, wherein
the transmission timing setting step further comprises:
setting the delay time to be less than a value obtained by dividing a sensor distance between the first ultrasonic sensor and the second ultrasonic sensor by the speed of sound.

15. The object detection method according to claim 13, wherein
the transmission timing setting step further comprises:
changing the delay time at each arrival of the first transmission timing, such that the delay time between the preceding first transmission timing and the immediately succeeding second transmission timing and the delay time between the current first transmission timing and the immediately succeeding second transmission timing are different from one another.

16. The object detection method according to claim 13, wherein
the transmission timing setting step further comprises:
changing the delay time for the second ultrasonic sensor in response to overlap occurring between a received reflected wave and reverberation, or in response to received reflected waves overlapping one another.

17. The object detection method according to claim 15, wherein
the transmission timing setting step further comprises:
setting an amount of change in the delay time to be equal to or greater than a time width of a reception signal of the reflected wave.

18. The object detection method according to claim 15, wherein
the transmission timing setting step further comprises:
setting an amount of change in the delay time to be equal to or greater than a reverberation time.

* * * * *